US010014774B2

(12) United States Patent
Zhang et al.

(10) Patent No.: US 10,014,774 B2
(45) Date of Patent: Jul. 3, 2018

(54) POWER SUPPLY WITH LOW TO HIGH POWER TRANSITION MODE

(71) Applicant: TEXAS INSTRUMENTS INCORPORATED, Dallas, TX (US)

(72) Inventors: Gangqiang Zhang, Plano, TX (US); Vaibhav Garg, Plano, TX (US); Xiaochun Zhao, Allen, TX (US); Angelo W. D. Pereira, Plano, TX (US); Vijayalakshmi Devarajan, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/296,839

(22) Filed: Oct. 18, 2016

(65) Prior Publication Data

US 2018/0109186 A1 Apr. 19, 2018

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/0009* (2013.01)

(58) Field of Classification Search
CPC ........ H02M 1/08; H02M 3/155; H02M 3/156; H02M 3/158; H02M 2001/0009; H02M 2003/156; H02M 2003/158
See application file for complete search history.

(56) References Cited

U.S. PATENT DOCUMENTS

| | | | | |
|---|---|---|---|---|
| 7,504,812 B2 * | 3/2009 | Riehl | .................... | H02M 3/156 323/224 |
| 7,990,119 B2 * | 8/2011 | Petty | .................... | H02M 3/156 323/268 |
| 8,406,014 B2 | 3/2013 | Liu et al. | | |
| 8,885,361 B2 * | 11/2014 | Pedersen | ............ | H02M 3/3385 363/21.04 |
| 2013/0033902 A1 | 2/2013 | Zhang | | |
| 2013/0076129 A1 * | 3/2013 | Kunimitsu | .......... | B60L 11/1859 307/10.7 |

(Continued)

FOREIGN PATENT DOCUMENTS

| | | |
|---|---|---|
| EP | 1973220 A1 | 9/2008 |
| JP | H09215320 A | 8/1997 |

OTHER PUBLICATIONS

PCT Search Report for Application No. PCT/US 2017/057263, dated Mar. 15, 2018.

*Primary Examiner* — Matthew Nguyen
(74) *Attorney, Agent, or Firm* — Lawrence J. Bassuk; Charles A. Brill; Frank D. Cimino

(57) ABSTRACT

One example includes a switching power supply. The switching power supply includes a power stage, a feedback loop, and a simulated feedback error generator. The power stage provides an output signal in response to a switching signal. The feedback loop monitors the output signal and provides a feedback error signal to adjust the switching signal to regulate the output signal. The simulated feedback error generator temporarily provides a simulated feedback error signal during a transition period from the low power mode to a high power mode of the switching power supply until the feedback loop has enough time to provide the feedback error signal.

19 Claims, 3 Drawing Sheets

VOUT VREF VOLTAGE LOOP AMPLIFIER 216 212 S2 VEA S1 VFB 214 VFB=VOUT/k2 242 S3 VOLTAGE LOOP COMPENSATION 244 CURRENT LOOP AMPLIFIER 220 CEA 250 S4 CURRENT LOOP COMPENSATION 246 200 PWM COMPARATOR 226 VIN 236 262 258 264 260 L1 252 POWER STAGES L2 266 254 268 256 VOUT 232 240 248 PWM COMPARATOR 228 230 LOW POWER MODE CONTROLLER VOLTAGE CLAMP 222 Vmin=REF_MIN Vmax=REF_MAX CURRENT SENSE 218 CSENSE 238 VIN VDD PRECHARGE VOLTAGE GENERATOR PRECHARGE RAMP GEN 224 VIN BU RAMP BO RAMP

(56) References Cited

U.S. PATENT DOCUMENTS

2014/0210523 A1* 7/2014 Geng ................. H03K 19/0016
327/143
2016/0301407 A1* 10/2016 Chen ....................... H02M 1/08

* cited by examiner

200
VIN
236
262
264
258
260
POWER
STAGES
266
268
254
256
252
L1
L2
VOUT
240
232
248
PWM
COMPARATOR
226
PWM
COMPARATOR
228
230
LOW POWER
MODE
CONTROLLER
CURRENT
LOOP
AMPLIFIER
220
CEA
S4
250
CURRENT LOOP
COMPENSATION
246
PRECHARGE
BU RAMP
BO RAMP
238
PRECHARGE
VOLTAGE
GENERATOR
RAMP GEN
224
VIN
VDD
VIN
CSENSE
S3
VEA
242
VOLTAGE LOOP
COMPENSATION
244
VOLTAGE LOOP
AMPLIFIER
216
VOLTAGE CLAMP
Vmin=REF_MIN
Vmax=REF_MAX
222
CURRENT SENSE
218
VREF
S2
S1
VFB
212
214
VFB=VOUT/k2
VOUT

POWER SUPPLY WITH LOW TO HIGH POWER TRANSITION MODE

TECHNICAL FIELD

This disclosure relates generally to power supplies, and more specifically to a power supply with a low to high power transition mode.

BACKGROUND

A switching mode power supply (SMPS) is an electronic power supply that incorporates a switching regulator to convert electrical power efficiently. The SMPS transfers power from a DC or AC source, to DC loads, such as automotive electronics, while converting voltage and current characteristics. Unlike a linear power supply, the SMPS continually switches between low-dissipation, full-on and full-off states, and spends very little time in the high dissipation transitions, which minimizes wasted energy. Voltage regulation is achieved by varying the ratio of on-to-off time. In contrast, a linear power supply regulates the output voltage by continually dissipating power. This higher power conversion efficiency is an important advantage of the SMPS.

There is a common issue with SMPS: the power efficiency is very low when the load current is low because the controller consumes a fixed amount of power regardless of load current. To improve the efficiency in this case, a low power mode operation can be added to shut down function blocks in regular (high power) feedback loop while keeping the output regulated with a simple and low current controller. Low power mode helps to eliminate the power consumption of the regular controller when load current is low. However, the transition from low power mode to high power mode can cause output voltage overshoot or dip if the handover of two modes is not smooth.

SUMMARY

One example includes a switching power supply. The switching power supply includes a power stage, a feedback loop, and a simulated feedback error generator. The power stage provides an output signal in response to a switching signal. The feedback loop monitors the output signal and provides a feedback error signal to adjust the switching signal to regulate the output signal. The simulated feedback error generator temporarily provides a simulated feedback error signal during a transition period from the low power mode to a high power mode of the switching power supply until the feedback loop has enough time to provide the feedback error signal.

Another example includes a method for providing an output signal for a switching power supply. The method includes generating the output signal in response to a switching signal; providing a feedback error signal associated with the output signal to adjust the switching signal to continuously regulate the output signal; disabling the feedback signal during a low power mode; supplying a low power switching signal to the power stage during the low power mode; and temporarily providing a simulated feedback error signal during a transition period from the low power mode to a high power mode of the switching power supply until circuitry associated with the feedback signal has transitioned back into providing the feedback signal.

Another example includes another switching power supply. The switching power supply includes a voltage loop amplifier, a current loop amplifier, a precharge voltage generator, and a current sense element. The voltage loop amplifier produces a voltage error amplitude voltage indicating an amount of voltage error produced by the switching power supply during a high power mode. The current loop amplifier produces a current error amplitude voltage indicating an amount of current error produced by the switching power supply during the high power mode. The precharge voltage generator determines and applies a precharge voltage to an output of a current loop amplifier during a transition period between a low power mode and the high power mode of the switching power supply, where a transitioning to the high power mode disables the precharge voltage applied during the transition period. The switch, at an output of the precharge voltage generator, switchably disconnects the precharge generator from an output of the current loop amplifier when changing from the transition period to the high power mode. The current sense element applies a current amplitude voltage to the output of the voltage loop amplifier during the transition period between the low power mode and the high power mode, where a transition to the high power mode disables the current amplitude voltage applied by the current sense element during the transition period.

DETAILED DESCRIPTION

This disclosure relates to a switching power supply and method that smooths a transition from a low power mode to a high power mode of the switching power supply (SMPS). The disclosure avoids output voltage overshoot and dip during SMPS transition from the low power mode to the high power mode. In one example, the switching power supply includes a power stage, a feedback loop, a low power mode controller, and a simulated feedback error generator. The power stages element provides an output signal in response to a switching signal. The feedback loop monitors the output signal and provides a feedback error signal to adjust a duty cycle of the switching signal to regulate the output signal. The low power mode controller disables the feedback loop during a low power mode and temporarily supplies the switching signal to the power stages element during the low power mode. The simulated feedback error generator temporarily provides a simulated feedback error signal during a transition period from the low power mode to a high power mode of the switching power supply, wherein the low power mode controller enables the simulated feedback error generator during the transition period.

Conventionally transitioning from the low power mode to the high power mode requires an amount of time for the SMPS to settle at producing a voltage that meets a target voltage, with the feedback loop being used to monitor and correct for error in the voltage produced by the SMPS. By applying the simulated feedback error switching signal to the switching power supply during the transition period from the low power mode, the SMPS can begin the high power mode substantially at a target voltage, which substantially mitigates the amount of time needed for the SMPS to settle at producing a voltage that meets a target voltage. Thus, adding the simulated feedback error generator to the SMPS smooths a transition from the low power mode to the high power mode.

Figure 1:
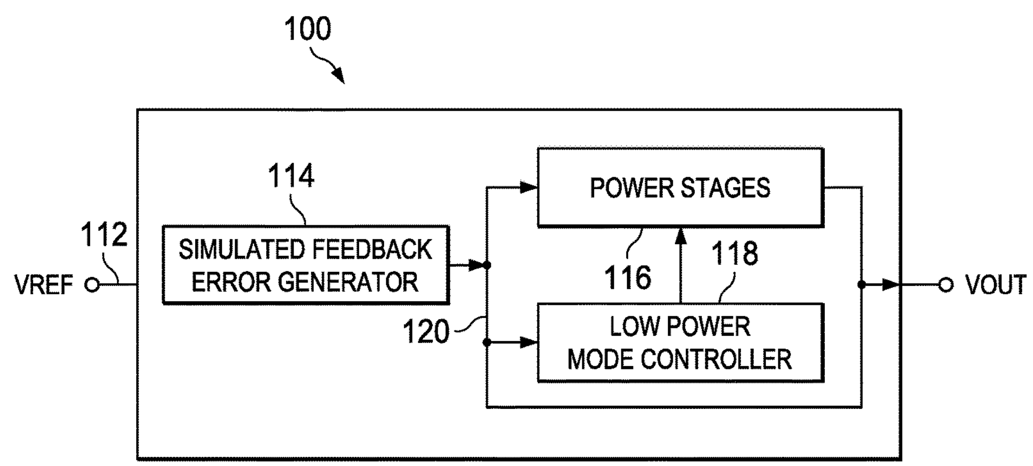
FIG. 1 illustrates an example of a system to smooth a transition from a low power mode to a high power mode of the system.

FIG. 1 illustrates an example of a system 100 to smooth a transition from a low power mode to a high power mode of the system 100. In an example, the system 100 is a switching power supply (SMPS). The system 100 includes a power stages 116 element coupled to a system output VOUT and a feedback loop 120, a low power mode controller 118 coupled to the power stages 116 and VOUT, and a simulated feedback error generator 114 coupled to the feedback loop 120. The feedback loop 120 is further coupled to the low power mode controller 118.

The system 100 converts an input direct current (DC) voltage to a proper output DC voltage available at VOUT. The system 100 modifies a duty cycle to arrive at such a target output DC voltage at VOUT. Such a voltage at VOUT can be maintained by the system 100 to substantially match a target predesigned voltage. In one example, the system 100 maintains a target predesigned current at VOUT by modifying the duty cycle. The system 100 operates in a low power mode and a high power mode, and additionally operates during a transition period between the low power mode and the high power mode. During the low power mode, much of the system 100 is disabled, with the remaining components of the system 100 producing a smaller amount of power than is available during the high power mode, discussed in more detail in FIG. 2. During the high power mode, the entire system 100 is activated to produce the target output DC voltage VOUT. During the transition period from the low power mode to the high power mode, the system 100 determines and applies a simulated feedback error signal to allow the system 100 to begin the high power mode producing a voltage that meets target voltage requirements at VOUT, substantially mitigating conventional time needed to settle at the target predesigned voltage VOUT for the system 100, thereby substantially mitigating overshoot and undershoot at VOUT that conventionally occurs after change to the high power mode.

The simulated feedback error generator 114 produces a simulated voltage error amplitude (VEA) signal that represents an amount of voltage error that exists at VOUT. In one example, the simulated feedback error generator 114 produces a simulated current error amplitude (CEA) signal that represents an amount of current error that exists at VOUT. The VEA signal and CEA signal produce a forced balanced state within system 100 to give the feedback loop 120 a proper starting point(s) with which to being the high power mode. When the low power mode controller 118 of the system 100 activates transition from the low power mode to the high power mode, the system 100 begins the transition period. During the transition period, the simulated feedback error generator 114 determines the simulated VEA signal and applies such a signal to the feedback loop 120 prior to a VOUT being produced by the system 100 in the high power mode. Thus, the feedback loop 120 has a beginning error signal applied during the transition period before any error even exists at VOUT, with such a beginning error signal setting the feedback loop 120 to produce a target VOUT. Then, during the transition of the system 100 to the high power mode, the simulated feedback error generator 114 is disabled and the normal feedback functions of the feedback loop 120 take over to maintain the target VOUT.

The simulated feedback error generator 114 accounts for variables within the system 100 that cannot be conventionally accounted for. For example, the simulated feedback error generator 114 accounts for variations in power, voltage, and temperature within the system 100 that results in changes to the simulated voltage error amplitude (VEA) signal and the simulated current error amplitude (CEA) signal. Likewise, the simulated feedback error generator 114 accounts for variations in switching frequencies of a particular modulator being employed within the system 100, manufacturing variations for the components within the system 100, variations in various input voltages VREF, VIN, VDD, etc. The simulated feedback error generator 114 accounts for any variations within the system 100 that results in changes to the simulated VEA signal and the simulated CEA signal that results in the system 100 beginning the high power mode with substantially zero error in the feedback loop 120.

The power stages 116 produces power for the system 100 during the low power mode and the high power mode. Such a low power mode requires less power at VOUT than is required during the high power mode. The power stages 116 is modulated with a signal having a duty cycle that allows the power stages 116 to maintain a target power at VOUT during the low power mode. The low power mode controller 118 provides such a modulated signal to the power stages 116. When the system 100 transitions from the low power mode to the high power mode, the low power mode controller 118 activates the power stages 116 to allow the system 100 to produce high power at VOUT. The low power mode controller 118 receives a voltage signal from VOUT during the low power mode to allow the low power mode controller 118 to modify a duty cycle used to produce a voltage at VOUT during the low power mode. In one example, the low power mode controller 118 receives a current signal from VOUT during the low power mode to allow the low power mode controller 118 to modify a duty cycle used to produce a current at VOUT during the low power mode.

In one specific example, the system 100 can be employed as a power supply to supply power to electronics of an automobile. When the automobile is being driven and the ignition is on, most of the automobile's electronics are active and consuming power. When the automobile is parked with the ignition off, most of the automobile's electronics are not needed and thus powered down. However, a small number of the automobile's electronics are still active even when the automobile is parked and the ignition is turned off. Thus, the system 100 operates in a low power mode when the automobile is parked with the ignition off and a high power mode when the ignition is turned on and most of the automobile's electronics are active. When the ignition changes to an on state, the electronics transition from this low power mode to the high power mode. As discussed above, conventionally such a change requires time for the system 100 to settle at a predesignated target voltage and current. The example system 100 substantially mitigates such delays when making the transition from an automobile's low power mode to the high power mode.

Figure 2:
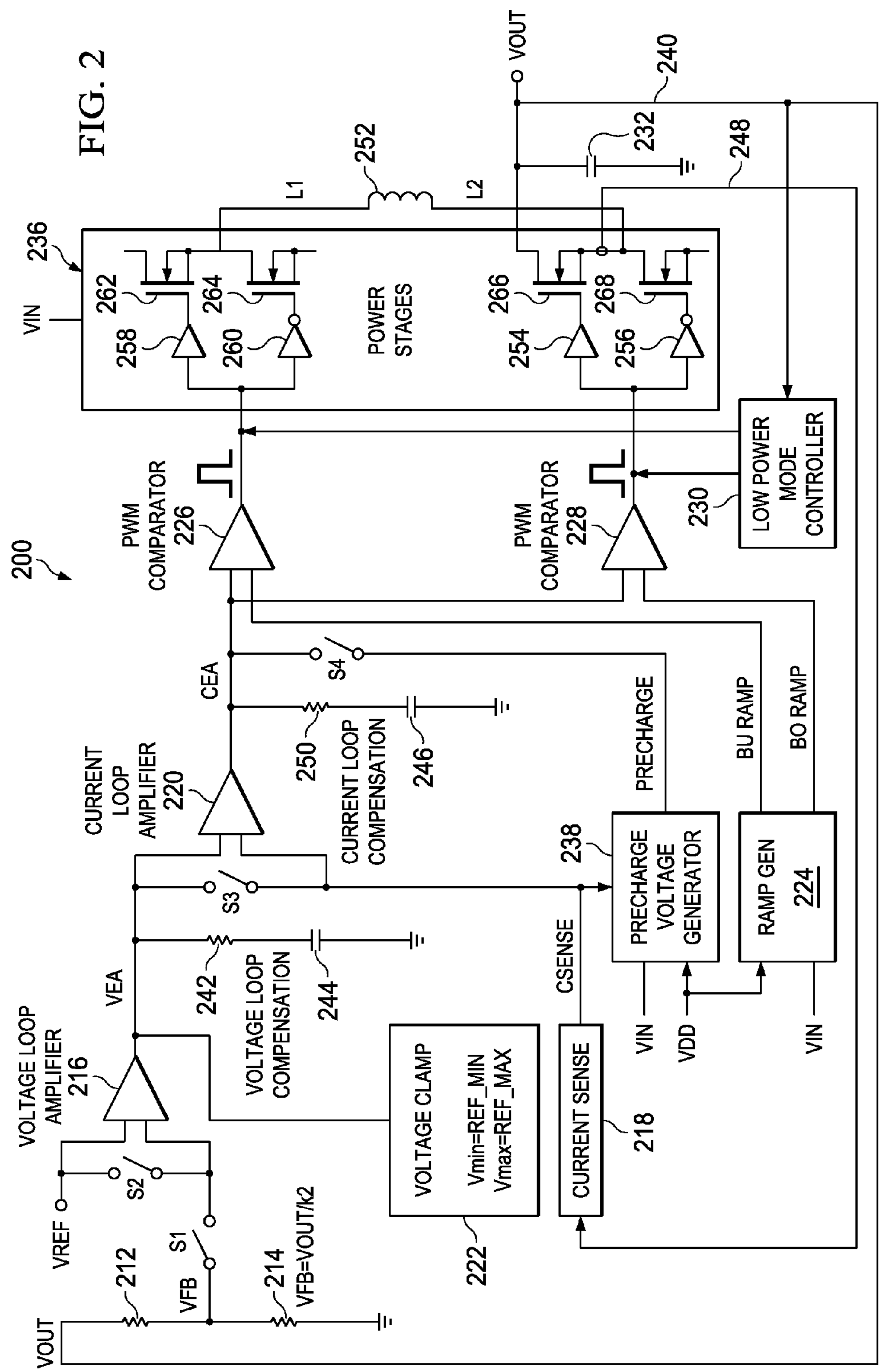
FIG. 2 illustrates an example circuit to smooth a transition from a low power mode to a high power mode of the circuit.

FIG. 2 illustrates an example circuit 200 to smooth a transition from a low power mode to a high power mode of the circuit 200. As used herein, the term circuit can include a collection of active and/or passive elements that perform a circuit function such as an amplifier and a comparator, for example. The term circuit can also include an integrated circuit where all the circuit elements are fabricated on a common substrate, for example.

The circuit 200 accepts a reference voltage VREF as an input to a voltage loop amplifier 216. The voltage loop amplifier 216 produces a voltage error amplitude (VEA) signal that represents an amount of voltage error within the voltage loop 240. The voltage loop amplifier 216 has a switch S2 coupled across its two input terminals. As part of the voltage feedback loop 240, a switch S1 is coupled to the input terminal of the voltage loop amplifier 216 opposite the VREF input. The switch S1 is coupled to the voltage feedback loop 240 between resistor 212 and resistor 214, the resistor 212 and resistor 214 forming a voltage divider. An output of the voltage loop amplifier 216 is coupled to a voltage clamp 222 that clamps an output voltage of the voltage loop amplifier 216 between a Vmin which is a minimum reference voltage at the output of the voltage loop amplifier 216 and a Vmax which is a maximum reference voltage at the output of the voltage loop amplifier 216. Capacitor 244 is coupled to resistor 242 which is coupled to the output of the voltage loop amplifier 216, the capacitor 244 and resistor 242 providing voltage loop compensation.

A current loop amplifier 220 is coupled to the output of the voltage loop amplifier 216. The current loop amplifier 220 produces a current error amplitude (CEA) signal that represents an amount of current error within the current loop 248. The current loop amplifier has a switch coupled across its two input terminals. One terminal of the current loop amplifier 220 is coupled to the output of the voltage loop amplifier 216 and the other terminal of the current loop amplifier 220 is coupled to the current sense 218 within the current feedback loop 248. The current sense 218 is additionally coupled to the precharge voltage generator 238. A capacitor 246 is coupled to a resistor 250, with the resistor 250 being coupled to an output of the current loop amplifier 220, such that the capacitor 246 and resistor 250 provide current loop compensation. A capacitor 232 is coupled to VOUT. The feedback loop 120 shown in FIG. 1 may include the voltage feedback loop 240, the current feedback loop 248, or both the voltage feedback loop 240 and the current feedback loop 248.

A ramp generator 224 is coupled to and provides a buck ramp modulated signal to PWM comparator 226 and boost ramp modulated signal to PWM comparator 228. In other examples, the ramp generator 224 produces a sawtooth wave signal. The PWM comparators 226 and 228 are coupled to the output of the current loop amplifier 220. The precharge voltage generator 238 is coupled to the output of the current loop amplifier 220. The current loop amplifier 220 outputs an error signal to the PWM comparators 226 and 228, with such an error signal setting the duty cycle of the circuit 200 to produce a target voltage and target current at VOUT. The precharge voltage generator 238 and the ramp generator 224 are coupled to an input voltage VDD. The outputs of the PWM comparators 226 and 228 are coupled to a power stages 236 circuit element, with the output of power stages 236 producing a target voltage and current at VOUT in both the high power mode and the low power mode. An inductor 252 is coupled across first and second stages of the power stages 236. The power stages 236 transitions the circuit 200 from the low power mode to the high power mode, producing target voltage and current in the low power mode via modulated signals temporarily received from the low power mode controller 230 during the low power mode. When in the high power mode, the power stages 236 is driven by a pulse voltage produced by the PWM comparators 226 and 228 and makes corresponding voltage available at VOUT. The precharge voltage generator 238, the ramp generator 224, and the power stages 236 are coupled to an input voltage VIN, with power from VIN being sent to VOUT.

The power stages 236 includes a first stage and a second stage. The first stage of the power stages 236 includes a buffer element 258 and an inverter 260 in parallel, both coupled to the output of the PWM comparator 226. An output of the buffer element 258 and inverter 260 are coupled to field-effect transistors (FETs) 262 and 264, respectively. The FETs 262 and 264 are coupled to inductor 252. The second stage of the power stages 236 includes a buffer element 254 and an inverter 256 in parallel, both coupled to the output of the PWM comparator 228. An output of the buffer element 254 and inverter 256 are coupled to FETs 266 and 268, respectively. The FET 266 is further coupled to VOUT and the current feedback loop 248, with FET 268 being coupled to inductor 252 and current feedback loop 248. In an example, the power stages 236 supports both a buck mode and a boost mode, with the VIN being either lower or higher than output voltage VOUT. When in buck mode, elements 228, 254, 256, 266, and 268 are not activated by the example circuit 200, and in the boost mode, elements 226, 258, 260, 262, and 264 are not activated by the example circuit 200.

During the low power mode, all components of the circuit 200 are powered off except the power stages 236 and the low power mode controller 230. The low power mode controller 230 includes a modulator that operates in the low power mode to set a duty cycle of the power stages 236. Such a duty cycle in the low power mode is based on feedback that the low power mode controller 230 receives from VOUT. During the low power mode, switches S1 are open and switches S2,S3 and S4 are closed. Closing switches S2 and S3 during the low power mode shorts the inputs of the loop amplifiers 216 and 220, respectively. Such shorting provides the benefit of establishing a balanced state for the loop amplifiers 216 and 220 when the loop amplifiers 216 and 220 begin being employed in the high power mode. At the moment of transition to the high power mode, switches S2 and S3 are opened to allow the voltage loop 240 and the current loop 248 to maintain the proper voltage and current at VOUT, respectively.

Opening switch S1 prevents a voltage from the voltage loop 240 from being applied to the voltage loop amplifier 216 during the low power mode. Opening switch S4 prevents the precharge voltage generator 238 from applying a precharge voltage, PRECHARGE, to the output of the current loop amplifier 220 during the high power mode. During the transition period between the low power mode and the high power mode of the circuit 200, the switch S4 is closed. Closing of switch S4 enables the precharge voltage generator 238 to apply a simulated voltage feedback error signal at the output of the current loop amplifier. Such a simulated voltage feedback error signal sets the starting duty cycle for the PWM comparators 226 and 228 as changing from the transition period to the high power mode. Thus, the circuit 200 begins the high power mode by powering on components of the circuit 200 that were powered off during the low power mode and begin producing a voltage, based on the precharge voltage produced by the precharge voltage generator 238, at VOUT with substantially zero error and matching a target voltage for VOUT.

In an example, the circuit 200 employs the current sense 218 within the current loop 248 to perform a function similar to that described for the precharge voltage generator 238, except to apply a simulated current feedback error signal, CSENSE voltage. The current sense 218 and the output of the voltage loop amplifier 220, VEA, are clamped to a common mode voltage. Such a simulated current feedback error signal sets the starting duty cycle for the PWM comparators 226 and 228 as changing from the transition period to the high power mode. Thus, the circuit 200 begins the high power mode by powering on components of the circuit 200 that were powered off during the low power mode and begin producing a current, based on the CSENSE voltage produced by the current sense 218, at VOUT with substantially zero error matching a target current for VOUT, substantially mitigating time needed for the circuit to settle at the target current for VOUT. In an application of the circuit 200 where setting a target voltage at VOUT at the beginning of the high power mode is a priority, the precharge voltage generator 238 may be employed without assistance from the current sense 218. Likewise, in an application of the circuit 200 where setting a target current at VOUT at the beginning of the high power mode is a priority, the current sense 218 may be employed without assistance from the precharge voltage generator 238. In an application of the circuit 200 where setting a target voltage and current at VOUT at the beginning of the high power mode are a priority, the current sense 218 and the precharge voltage generator 238 may both be employed. In an example, the precharge voltage generator 238 may operate with less transition accuracy on VOUT when the circuit 200 lacks the current sense 218 driving voltage loop amplifier 220. The current sense 218 drives the voltage loop amplifier 220 to operate the current loop.

The precharge voltage generator 238 determines the precharge voltage as a function of:

$$V_{PRE\text{-}CHARGE}=f(VIN,V_{DD},F_{SW},\text{Process},\text{Temperature}) \quad \text{Eq. 1,}$$

where VIN is supply voltage for power stages 236, $V_{DD}$ is the voltage applied to the precharge voltage generator 238 and the ramp generator 224, $F_{sw}$ is a switching frequency of the ramp generator 224, Process is constant that is programmed into the precharge voltage generator 238 to account for manufacturing variations of the circuit 200, and Temperature is a temperature of the circuit 200 during the transition period. The voltage produced by the precharge voltage generator 238 and the ramp generator 224 is independent of VDD, where variations to VDD will not affect VOUT, and the same being true for Fsw, process, and Temperature. In an example, a default Temperature can used to determine the precharge voltage, with the default Temperature for the circuit 200 being used when the circuit 200 is below a threshold temperature.

The precharge voltage generator 238 determines the precharge voltage applied at the output of the current loop amplifier 220, CEA, according to the equation:

$$V_{PRE\text{-}CHARGE}=((V_{OUT}+k1\times V_{CSENSE})\times V_{PWM\_RAMP})/VIN \quad \text{Eq. 2}$$

where $$\text{RampGain}=V_{PWM\_RAMP}/V_{IN} \quad \text{Eq. 3,}$$

where VOUT is the output voltage VOUT of the circuit 200, k1 is a current gain of the precharge voltage generator 238, $V_{CSENSE}$ is the voltage produced by the current sense 218. VIN is the common voltage being applied to the power stages 236, the precharge voltage generator 238, and the ramp generator 224. $V_{PWM\_RAMP}$ is either the buck ramp voltage (BU_RAMP) or the boost ramp voltage (BO_RAMP) produced by the ramp generator 224. Depending on the mode (buck or boost) of the ramp generator 224, power stages 236 is driven by one of the PWM comparators 226 and 228 associated with such modes. Ramp Gain tracks frequency of switching, resistance and capacitance for a buck regulator of the ramp generator 224, instead of using a fixed gain, generated using a replica of a ramp generator. In an example, k1 is set to an appropriate value so that the voltage produced by the precharge voltage generator 238 is a little higher, such that the duty cycle is a little higher to compensate at VOUT for any voltage loss that occurs in the power stages 236.

The precharge voltage generator 238 determines the precharge voltage applied at the output of the current loop amplifier 220, CEA, according to the equation:

$$V_{PRE\text{-}CHARGE}=((V_{REF}\times k2+k1\times R\times I_{CSENSE})\times V_{PWM\_RAMP})/VIN \quad \text{Eq. 4,}$$

where k2 is the ratio of VOUT-to-VFB voltage divider produced by resistors 212 and 214, and sets VOUT during the high power mode with VOUT=VFB*k2=VREF*k2. VREF*k2 tracks VOUT of the circuit 200 and any variation in feedback resistors 212 and 214 that sets up VOUT. R is the resistance of the field-effect transistor (FET) 254 when activated. The voltage produced by the current sense 218 is equal to $V_{CSENSE}=R*I_{CSENSE}$, with $I_{CSENSE}$ being the current sensed by the current sense 218 from the current feedback loop 248 as a basis for generating $V_{CSENSE}$, the voltage produced by the current sense 218. $k1*R*I_{CSENSE}$ tracks a resistance, RDSON, of FET 266 to calculate the proper CEA voltage dependent on whether there is a light or heavy load attached to the circuit 200. The output of the current sense 218 is coupled to the precharge voltage generator 238 as a basis of calculating Equation 4. That is, such a coupling allows the circuit to substantially prevent getting a lower VOUT voltage when output current is high, which allows for compensation of a VOUT voltage drop by increasing $V_{PRE\_CHARGE}$.

An example of VOUT in BUCK mode:

$$\begin{aligned} VOUT &= V_{PRE\_CHARGE}/V_{PWM\_RAMP}\times VIN - V_{DROP} \\ &= ((V_{REF}\times k2 + k1\times R\times I_{CSENSE})\times V_{PWM\_RAMP})/VIN\times VIN/V_{PWM\_RAMP} - V_{DROP} \\ &= V_{REF}\times k2 + k1\times R\times I_{CSENSE} - V_{DROP} \end{aligned}$$

Where $V_{REF}\times k2$ is ideal VOUT target voltage, $V_{DROP}$ is voltage loss due to power stages resistances; k1 is selected such that $k1\times R\times I_{CSENSE}-V_{DROP}=0$ $$VOUT=V_{REF}\times k2$$

It can be seen VOUT is at expected value during transition.

Figure 3:
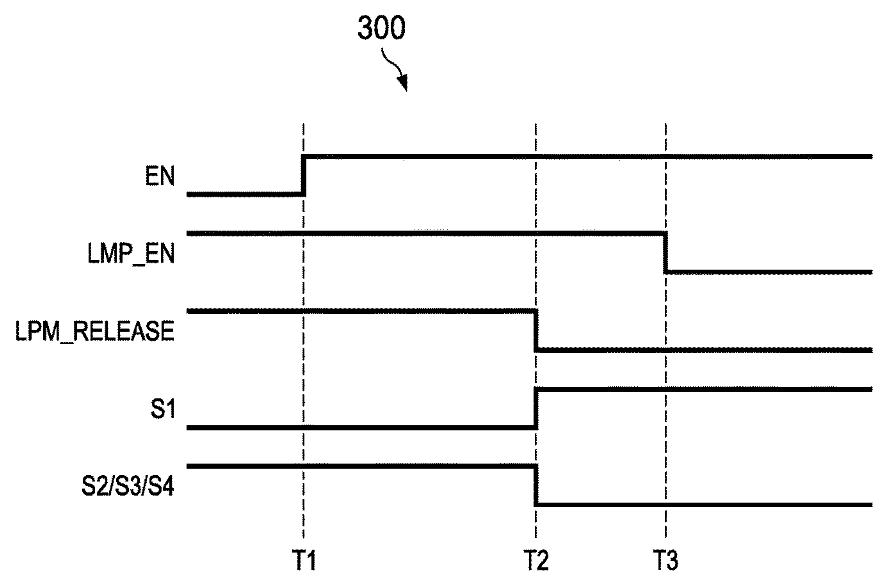
FIG. 3 illustrates an example timing diagram of the circuit shown in FIG. 2.

FIG. 3 illustrates an example timing diagram 300 of the circuit 200 shown in FIG. 2. The timing diagram 300 illustrates logic transitions for an enable signal "EN", a low power mode enable signal "LPM_EN", a low power mode release signal "LPM_RELEASE", a switching signal for switch S1, and a switching signal for switches S2, S3, and S4.

Before time T1, everything is turned off except 236, 230 252 and 232, system is in low power mode. At a time T1, EN goes high to activate the PWM comparators 226 and 228 and the ramp generator 224 and 216, 222, 220, 218, 238. Moreover, at time T1, the precharge voltage generator 238 and the current sense 218 ramp up toward target VEA, CSENSE, and CEA voltages. The PWM comparators 226 and 228, at T1, begin to ramp up power being produced by the circuit 200 towards a target power produced in the high power mode.

At a time T2, LPM_RELEASE goes low when all of the voltages VEA, CSENSE, and CEA voltages settle at their target values. Also at T2, switches S1 is closed and switches S2, S3, and S4 are opened to place the circuit 200 in the high power mode. The current loop 248 and the voltage loop 240 take over control of maintaining the power at VOUT at a target voltage and a target current level.

At a time T3, LPM_EN goes low to disable the low power mode of the circuit 200, which disables the precharge voltage generator 238 and low power mode controller 230. At T3, the circuit 200 completes the transition period and operates in the high power mode.

Figure 4:
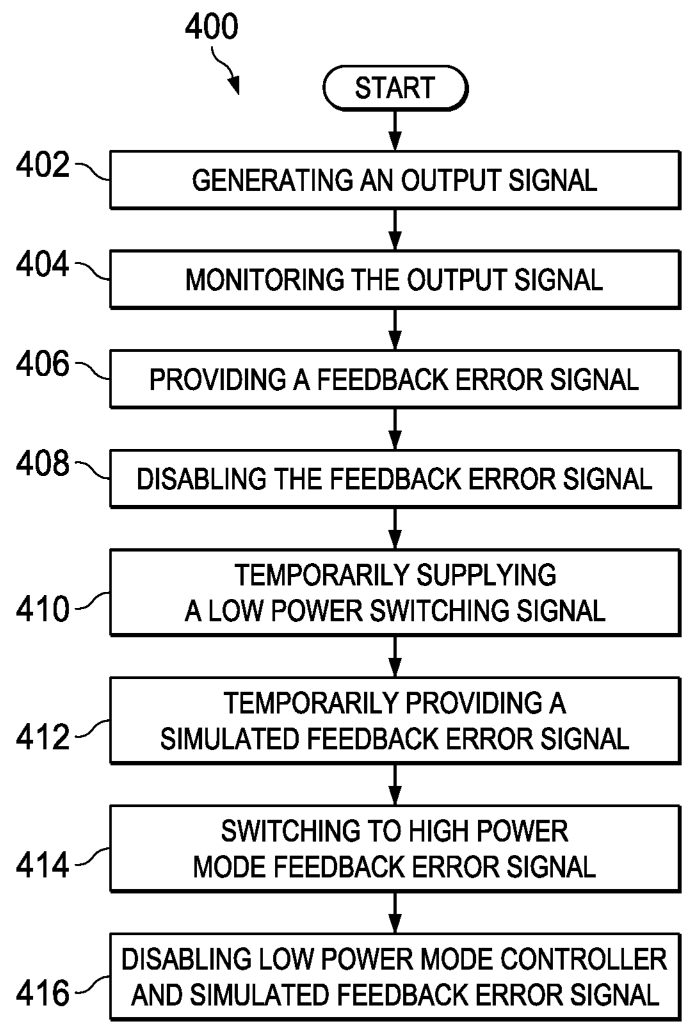
FIG. 4 illustrates an example of a method for smoothing a transition from a low power mode to a high power mode of the system and circuit shown in FIGS. 1 and 2.

In view of the foregoing structural and functional features described above, a method in accordance with various aspects of the present disclosure will be better appreciated with reference to FIG. 4. While, for purposes of simplicity of explanation, the method of FIG. 4 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure. Moreover, for simplicity of explanation, the methods of FIG. 4 can include additional functional features not discussed, with FIG. 4 being described with reference to the examples illustrated herein.

FIG. 4 illustrates an example of a method 400 for smoothing a transition from a low power mode to a high power mode of the system 100 and circuit 200 shown in FIGS. 1 and 2. At 402, the method 400 provides an output signal. The power stages 116 and 236 provide the output signal in response to a switching signal. The power stages 116 and 236 receive the switching signal from the low power mode controller 118 and 230. At 404 the method 400 monitors the output signal. The output signal, a voltage and/or current at VOUT, is monitored with the feedback loop 120. As discussed above, the feedback loop 120 may include the voltage feedback loop 240, the current feedback loop 248, or both the voltage feedback loop 240 and the current feedback loop 248.

At 406, the method 400 provides a feedback error signal. The feedback loop 120 provides a feedback error signal that is employed to adjust a duty cycle to regulate the output signal, VOUT. The feedback error signal includes at least one of a voltage feedback error representing an amount of error in the voltage available at VOUT, and a current feedback error representing an amount of error in the current being produced at VOUT during the high power mode. At 408, the method 400 disables the feedback loop 120. The low power mode controller 118 disables the feedback loops 120, 240, and 248 during a low power mode. Accordingly, the feedback error signal produced by the feedback loops 120, 240, and 248 is disabled in the low power mode.

Proceeding to 410, the method 400 temporarily supplies a switching signal. The low power mode controller 118 and 230 temporarily supply the switching signal to the power stages 116 during the low power mode. At 412, the method 400 temporarily provides the simulated feedback error signal. The simulated feedback error generator 114, current sense 218, and precharge voltage generator 238 provide a simulated feedback error signal to a switching power supply during a transition period from the low power mode, wherein the low power mode controller 118 enables the simulated feedback error generator 114, current sense 218, and precharge voltage generator 238 during the transition period until circuitry associated with the feedback error signal has transitioned back into providing the feedback error signal.

At 414, the method 400 switches to producing the feedback error signal. In the high power mode, the current loop amplifier 220 is activated to produce a feedback error signal. Then, at 416, the method 400 disables the low power mode controller 118 and the simulated feedback error signal produced by the simulated feedback error generator 114, current sense 218, and precharge voltage generator 238.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A switching power supply comprising:

a power stage that provides an output signal in response to a switching signal;

a feedback loop that monitors the output signal and provides a feedback error signal to adjust the switching signal to regulate the output signal;

a simulated feedback error generator that temporarily provides a simulated feedback error signal during a transition period from a low power mode to a high power mode of the switching power supply until the feedback loop has enough time to provide the feedback error signal; and a low power mode controller, separate from the feedback loop, that disables the feedback loop during a low power mode and supplies the switching signal to the power stage during the low power mode.

2. The switching power supply of claim 1, in which the feedback loop monitors error in the feedback loop to set a duty cycle of the switching power supply during the high power mode.

3. The switching power supply of claim 1, in which the low power mode controller enables the simulated feedback error generator during the transition period to provide the simulated feedback error signal.

4. The device of claim 1, including a switch in the feedback loop to short the feedback loop during the low power mode and the transition period.

5. The switching power supply of claim 1, in which the feedback loop includes both a voltage feedback loop and a current feedback loop, the voltage feedback loop modifying a duty cycle of the switching power supply to adjust a voltage of the output signal and the current loop feedback loop modifying the duty cycle to adjust a current of the output signal.

6. The switching power supply of claim 1, including a voltage clamp to clamp the feedback loop between a pre-established minimum voltage and a pre-established maximum voltage.

7. The switching power supply of claim 1, in which the simulated feedback error generator determines the simulated feedback error signal during the transition period based on at least one of a temperature of the switching power supply, a reference voltage applied to the switching power supply, and a switching frequency of the switching power supply.

8. An automobile including the switching power supply of claim 1.

9. A method for providing an output signal for a switching power supply, the method comprising:

generating the output signal from a power stage in response to a high power switching signal from a feedback loop in a high power mode;

providing a feedback error signal associated with the output signal to adjust the high power switching signal to continuously regulate the output signal;

disabling the feedback error signal during a low power mode iy disabling the feedback loop;

supplying a low power switching signal to the power stage from a low power controller separate from the feedback loop during the low power mode; and temporarily providing a simulated feedback error signal during a transition period from the low power mode to a high power mode of the switching power supply until circuitry associated with the feedback error signal has transitioned back into providing the feedback error signal.

10. The method of claim 9, including monitoring the feedback error signal to set a duty cycle of the switching power supply during the high power mode.

11. The method of claim 10, including setting the duty cycle of the switching power supply to adjust a voltage of the output signal based on the feedback error signal during the high power mode.

12. The method of claim 10, including setting the duty cycle of the switching power supply to adjust a current of the output signal based on the feedback error signal during the high power mode.

13. The method of claim 9, including shorting a feedback loop of the switching power supply during the low power mode and the transition period.

14. The method of claim 9, including clamping a feedback loop of the switching power supply between a pre-established minimum voltage and a pre-established maximum voltage.

15. The method of claim 9, including determining the simulated feedback error signal during the transition period based on at least one of a temperature of the switching power supply, a reference voltage applied to the switching power supply, and a switching frequency of the switching power supply.

16. The method of claim 9, including shorting a current loop amplifier and a voltage loop amplifier of the switching power supply during the low power mode and the transition period.

17. A switching power supply, comprising:

a voltage loop amplifier to produce a voltage error amplitude voltage indicating an amount of voltage error produced by the switching power supply during a high power mode;

a current loop amplifier to produce a current error amplitude voltage indicating an amount of current error produced by the switching power supply during the high power mode;

a precharge voltage generator to determine and apply a precharge voltage to an output of a current loop amplifier during a transition period between a low power mode and the high power mode of the switching power supply, where a change to the high power mode disables the precharge voltage applied during the transition period;

a switch, at an output of the precharge voltage generator, to switchably disconnect the precharge generator from an output of the current loop amplifier when changing from the transition period to the high power mode; and a current sense element to apply a current amplitude voltage to the output of the voltage loop amplifier during the transition period between the low power mode and the high power mode, where a change to the high power mode disables the current amplitude voltage applied by the current sense element during the transition period.

18. The switching power supply of claim 17, wherein the precharge voltage generator determines the precharge voltage for the transition period based on at least one of a temperature of the device, a reference voltage to the device, and a switching frequency of the device.

19. The switching power supply of claim 17, further comprising a second switch at an input of the voltage loop amplifier to short the voltage loop amplifier during the low power mode and the transition period.

* * * * *